US012726316B2

(12) United States Patent
Yuan et al.

(10) Patent No.: US 12,726,316 B2
(45) Date of Patent: Sep. 1, 2026

(54) AUTONOMOUS PRECONFIGURED MEASUREMENT GAP ACTIVATION FOR PRS MEASUREMENT

(71) Applicant: Nokia Technologies Oy, Espoo (FI)

(72) Inventors: Ping Yuan, Beijing (CN); Jing He, Beijing (CN); Jürgen Hofmann, Merching (DE); Tero Henttonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 245 days.

(21) Appl. No.: 18/727,574

(22) PCT Filed: Jan. 10, 2022

(86) PCT No.: PCT/CN2022/071103
§ 371 (c)(1),
(2) Date: Jul. 9, 2024

(87) PCT Pub. No.: WO2023/130468
PCT Pub. Date: Jul. 13, 2023

(65) Prior Publication Data

US 2025/0125929 A1 Apr. 17, 2025

(51) Int. Cl.
*H04L 5/00* (2006.01)
*H04W 64/00* (2009.01)

(52) U.S. Cl.
CPC .......... *H04L 5/0051* (2013.01); *H04L 5/0094* (2013.01); *H04W 64/00* (2013.01)

(58) Field of Classification Search
CPC ... H04W 64/00; H04W 24/10; H04W 64/003; H04W 4/029; H04L 5/0051;
(Continued)

(56) References Cited

U.S. PATENT DOCUMENTS

2012/0252487 A1* 10/2012 Siomina ................ H04W 24/10 455/456.1
2015/0071101 A1* 3/2015 Mager .................. H04W 24/10 370/332
(Continued)

FOREIGN PATENT DOCUMENTS

CN 113853023 A 12/2021
WO 2020/143619 A1 7/2020
(Continued)

OTHER PUBLICATIONS

"3rd Generation Partnership Project; Technical Specification Group Radio Access Network; NR; Radio Resource Control (RRC) Protocol Specification (Release 16)", 3GPP TS 38.331, V16.7.0, Dec. 2021, pp. 1-963.
(Continued)

*Primary Examiner* — Allahyar Kasraian
(74) *Attorney, Agent, or Firm* — Barta Jones, PLLC

(57) ABSTRACT

Example embodiments of the present disclosure relate to devices, methods, apparatuses and computer readable storage media of autonomous preconfigured measurement gap (Pre-MG) activation for a measurement of a positioning reference signal (PRS). In example embodiments, if it is determined that a measurement is to be performed for a PRS, a terminal device evaluates whether a Pre-MG is suitable for the measurement of the PRS. Then, the terminal device decides whether a Pre-MG is to be activated and transmits, to a base station, a first indication whether the Pre-MG is suitable for the measurement of the PRS.

20 Claims, 7 Drawing Sheets

(58) Field of Classification Search
CPC ..... H04L 5/0048; H04L 5/0094; H04L 5/001; H04L 5/0023; H04L 5/0092; H04L 5/0098; H04L 5/0069; H04L 5/0078; H04L 27/2613
See application file for complete search history.

(56) References Cited

U.S. PATENT DOCUMENTS

| | | | | |
|---|---|---|---|---|
| 2024/0129893 | A1* | 4/2024 | Si | H04W 64/00 |
| 2024/0179583 | A1* | 5/2024 | Rao | H04W 36/0058 |
| 2024/0187903 | A1* | 6/2024 | Hasegawa | G01S 5/0036 |

FOREIGN PATENT DOCUMENTS

| | | | |
|---|---|---|---|
| WO | 2020/222172 | A1 | 11/2020 |
| WO | 2021/237531 | A1 | 12/2021 |
| WO | 2022/006185 | A2 | 1/2022 |

OTHER PUBLICATIONS

“3rd Generation Partnership Project; Technical Specification Group Radio Access Network; NR; Requirements for support of radio resource management (Release 17)”, 3GPP TS 38.133, V17.3.0, Sep. 2021, 3206 pages.

“New WI Proposal: NR measurement gap enhancements”, 3GPP TSG RAN Meeting #89e, RP-202119, Agenda: 9.1.2, Intel Corporation, Sep. 14-18, 2020, 5 pages.

“Revised WID on NR and MR-DC measurement gap enhancements”, 3GPP TSG RAN Meeting #94e, RP-213658, Agenda: 9.3.4.10, Intel Corporation, Dec. 6-17, 2021, 5 pages.

“LS on R17 NR MG enhancements—Pre-configured MG”, 3GPP TSG RAN WG4 Meeting #101-e, R4-2120302, RAN WG4, Nov. 1-12, 2021, 3 pages.

“3rd Generation Partnership Project; Technical Specification Group Radio Access Network; LTE Positioning Protocol (LPP) (Release 16)”, 3GPP TS 37.355, V16.7.0, Dec. 2021, pp. 1-299.

International Search Report and Written Opinion received for corresponding Patent Cooperation Treaty Application No. PCT/CN2022/071103, dated May 30, 2022, 9 pages.

“Further discussion on pre-configured measurement gap for NR”, 3GPP TSG-RAN4 Meeting #101-e, R4-2117823, Agenda: 8.11.2.1, Xiaomi, Nov. 1-12, 2021, 5 pages.

Office action received for corresponding Chinese Patent Application No. 202280005559.6, dated Jan. 30, 2026, 9 pages of office action and 6 pages of translation available.

“Discussion on pre-configured MG pattern”, 3GPP TSG-RAN4 Meeting #101-e, R4-2117351, Agenda: 8.11.2.1, CATT, Nov. 1-12, 2021, 8 pages.

* cited by examiner

AUTONOMOUS PRECONFIGURED MEASUREMENT GAP ACTIVATION FOR PRS MEASUREMENT

FIELD

Example embodiments of the present disclosure generally relate to the field of communications, and in particular, to devices, methods, apparatuses and computer readable storage media of autonomous preconfigured measurement gap (MG) activation for a positioning reference signal (PRS) measurement.

BACKGROUND

New Radio (NR) and Multi-RAT Dual Connectivity (MR-DC) measurement gap (MG) enhancements have been discussed for NR Radio resource management (RRM) enhancements for Release 17 (Rel-17). The measurement gap enhancements may involve pre-configured MG per active bandwidth part (BWP), multiple concurrent and independent MG patterns and Network Controlled Small Gaps (NCSG).

It is agreed to support user equipment (UE) autonomous pre-configured MG (also referred to as Pre-MG) pattern(s) activation and/or deactivation mechanism for measurement of a synchronization signal block (SSB) (also referred to as a SSB measurement). However, for a measurement of a positioning reference signal (also referred to as a PRS measurement), the Pre-MG is proposed to be always activated if the PRS measurement is configured. There are inconsistent requirements for the Pre-MG pattern configurations in the SSB measurement and PRS measurement.

SUMMARY

In general, example embodiments of the present disclosure provide devices, methods, apparatuses and computer readable storage media of autonomous preconfigured measurement gap (MG) activation for a PRS measurement.

In a first aspect, a terminal device is provided which comprises at least one processor and at least one memory including computer program code. The at least one memory and the computer program code are configured to, with the at least one processor, cause the terminal device to in accordance with a determination that a measurement is to be performed for a positioning reference signal, evaluate whether a preconfigured measurement gap is suitable for the measurement of the positioning reference signal. The terminal device is further caused to decide whether a preconfigured measurement gap is to be activated and transmit, to a base station, a first indication whether the preconfigured measurement gap is suitable for the measurement of the positioning reference signal.

In a second aspect, a base station is provided which comprises at least one processor and at least one memory including computer program code. The at least one memory and the computer program code are configured to, with the at least one processor, cause the base station to receive, from a terminal device, a first indication whether a preconfigured measurement gap is suitable for a measurement of a positioning reference signal. The base station is further caused to determine, based on the first indication, a measurement gap to be activated by the terminal device for the measurement of the positioning reference signal.

In a third aspect, a method is provided. In the method, if it is determined that a measurement is to be performed for a positioning reference signal, a terminal device evaluates whether a preconfigured measurement gap is suitable for the measurement of the positioning reference signal. Then, the terminal device decides whether a preconfigured measurement gap is to be activated and transmits, to a base station, a first indication whether the preconfigured measurement gap is suitable for the measurement of the positioning reference signal.

In a fourth aspect, a method is provided. In the method, a base station receives, from a terminal device, a first indication whether a preconfigured measurement gap is suitable for a measurement of a positioning reference signal. Based on the first indication, the base station is further caused to determine a measurement gap to be activated by the terminal device for the measurement of the positioning reference signal.

In a fifth aspect, there is provided an apparatus comprising means for performing the method according to the third or fourth aspect.

In a sixth aspect, there is provided a computer readable storage medium comprising program instructions stored thereon. The instructions, when executed by a processor of a device, cause the device to perform the method according to the third or fourth aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
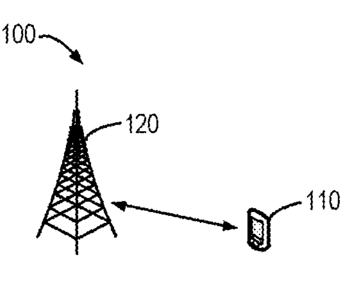
FIG. 1 illustrates an example environment in which example embodiments of the present disclosure can be implemented.

Principle of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" or "user equipment" (UE) refers to any terminal device capable of wireless communications with each other or with the base station. The communications may involve transmitting and/or receiving wireless signals using electromagnetic signals, radio waves, infrared signals, and/or other types of signals suitable for conveying information over air. In some example embodiments, the UE may be configured to transmit and/or receive information without direct human interaction. For example, the UE may transmit information to the base station on predetermined schedules, when triggered by an internal or external event, or in response to requests from the network side.

Examples of the UE include, but are not limited to, smart phones, wireless-enabled tablet computers, laptop-embedded equipment (LEE), laptop-mounted equipment (LME), wireless customer-premises equipment (CPE), sensors, metering devices, personal wearables such as watches, and/or vehicles that are capable of communication. For the purpose of discussion, some example embodiments will be described with reference to UEs as examples of the terminal devices, and the terms "terminal device" and "user equipment" (UE) may be used interchangeably in the context of the present disclosure.

As used herein, the term "base station" (BS) refers to a network device via which services can be provided to a terminal device in a communication network. The base station may comprise any suitable device via which a terminal device or UE can access the communication network. Examples of the base stations include a relay, an access point (AP), a transmission point (TRP), a node B (NodeB or NB), an evolved NodeB (eNodeB or eNB), a New Radio (NR) NodeB (gNB), a Remote Radio Module (RRU), a radio header (RH), a remote radio head (RRH), a low power node such as a femto, a pico, and the like.

As used herein, the term "circuitry" may refer to one or more or all of the following:

(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular base station, or other computing or base station.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As used herein, the terms "first", "second" and the like may be used herein to describe various elements, these elements should not be limited by these terms. These terms are only used to distinguish one element from another. For example, a first element could be referred to as a second element, and similarly, a second element could be termed a first element, without departing from the scope of example embodiments. As used herein, the term "and/or" includes any and all combinations of one or more of the listed terms.

For Pre-MG enhancement, it is intended to perform a fast MG configuration by using a Pre-MG in a UE. The configuration parameters of a Pre-MG such as a Measurement Gap Repetition Period (MGRP) and a Measurement Gap Length (MG) are the same as those of Release 16 (Rel-16) legacy MG. For the fast MG configuration, some requirements for Pre-MG pattern(s) are proposed to follow a DCI or timer based BWP switch, for example, per BWP MG configuration. For example, the mechanisms of activation and/or deactivation of a MG may follow a DCI or timer based BWP switch. Rules, UE behavior, procedures and signaling for activation and/or deactivation of a MG may follow a DCI or timer based BWP switch. Moreover, measurement period requirements with Pre-MG pattern(s) may be defined in the presence of one or more BWP switch per measurement period. However, there is no detailed mechanism on how to activate and/or deactivate the Pre-MG.

UE autonomous Pre-MG activation and/or deactivation mechanism is also agreed. For example, a network (NW) may signal the Pre-MG configurations (such as MGRP, MGL and offset) to the UE, then the UE determines whether the Pre-MG may be activated or not upon BWP switching. For example, if the original BWP may cover or be overlapped with a new SSB, then the Pre-MG may be deactivated; otherwise, Pre-MG may be activated.

Furthermore, it is agreed that the concept of a Pre-MG is feasible for both a SSB measurement and a PRS measurement. It is expected to design signaling to support a PRS measurement with a Pre-MG. For a SSB measurement, the Pre-MG activation and/or deactivation status is decided upon the BWP switching. For a PRS measurement, the Prc-MG is proposed to be always activated if the PRS measurement is configured. This is totally different from the mechanism for the SSB measurement where a gap is ON or OFF according to BWP switching in a serving cell. It may be up to the NW to configure either Pre-MG which is always activated or legacy MG for a PRS measurement.

For a PRS measurement, if the UE receives the PRS measurement from an upper layer, for example, in a long term evolution (LTE) Positioning Protocol (LPP) from a location server such as a Location Management Function (LMF) or an Enhanced Serving Mobile Location Center (E-SMLC), the UE may send a Location Measurement Indication message to an gNB to inform the gNB that the PRS measurement is triggered by the UE if the UE requires new measurement gaps for these operations.

Given that it is agreed that Pre-MG for PRS measurement is always activated when a PRS measurement configuration is received, there will have a problem to use the UE autonomous Pre-MG activation/deactivation mechanism for the PRS measurement. For example, if the UE is configured with a Pre-MG for a SSB measurement, the UE determines whether the pre-configured gap should be activated or not upon BWP switching. If the UE receives the PRS measurement from the LPP, the UE may send a Location Measurement Indication to the gNB to inform the gNB that PRS measurement is triggered and the pre-MG in the gNB side should be activated. In this case, the Pre-MG activation behaviour is changed. The Pre-MG will be always activated even though BWP switching does not happen. For example, after sending the Location Measurement Indication to the gNB, if the autonomous Pre-MG activation/deactivation mechanism is used, the UE will always activate the Pre-MG autonomously and gNB will always activate the Pre-MG after the Location Measurement Indication is received.

A Pre-MG configured for a SSB measurement is possibly to be applied for a PRS measurement if the Pre-MG can cover both SSB and PRS locations in a time domain. However, in the case that the Pre-MG is not suitable for the PRS measurement, for example, the Pre-MG cannot cover any of the PRS occasions in a time domain because the gap's offset is not aligned with the offset of a NR Downlink (DL)-PRS, it will cause that the UE cannot perform the PRS measurement during the gap. Hence, the Pre-MG is always activated but it cannot be used by UE. If the Pre-MG activated for PRS measurement is not needed for the SSB measurement, for example, the current active BWP is overlapped with the measured SSB, and the MG is not needed, the system performance will be downgraded as the UE activates the MG in vain. In other words, the UE autonomous Pre-MG activation/deactivation mechanism cannot work for the scenario where the previous configured Pre-MG (for the SSB measurement) cannot be reused for the PRS measurement. As a result, the UE cannot perform the PRS measurement in the activated MG.

Example embodiments of the present disclosure provide an enhanced Pre-MG activation/deactivation mechanism which is workable in the scenario where the previous configured Pre-MG (for example, for a SSB measurement) cannot be reused for a PRS measurement. In the case that a terminal device (such as a UE) is configured with a Pre-MG which may be used for a SSB measurement or other measurements, if the terminal device determines that a measurement is to be performed for a PRS, the terminal device evaluates whether the Pre-MG is suitable for the measurement of the PRS and indicates a result of the evaluating to a base station (such as a gNB).

The mechanism enables the UE autonomous Pre-MG activation/deactivation to be workable for the PRS measurement. Without such a mechanism, the UE autonomous Pre-MG activation/deactivation mechanism cannot be used for PRS measurement, or the system performance will be downgraded due to the activation of a Pre-MG that is useless for the PRS measurement.

FIG. 1 shows an example environment 100 in which example embodiments of the present disclosure can be implemented.

The environment 100, which may be a part of a communication network, comprises a terminal device 110 and a base station 120 that can communicate with each other. It is to be understood that two devices are shown in the environment 100 only for the purpose of illustration, without suggesting any limitation to the scope of the present disclosure. Any suitable numbers of devices may be included in the environment 100.

The communications in the environment 100 may follow any suitable communication standards or protocols, which are already in existence or to be developed in the future, such as Universal Mobile Telecommunications System (UMTS), long term evolution (LTE), LTE-Advanced (LTE-A), the fifth generation (5G) New Radio (NR), Wireless Fidelity (Wi-Fi) and Worldwide Interoperability for Microwave Access (WiMAX) standards, and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, machine type communication (MTC), enhanced mobile broadband (eMBB), massive machine type communication (mMTC), ultra-reliable low latency communication (URLLC), Carrier Aggregation (CA), Dual Connection (DC), and New Radio Unlicensed (NR-U) technologies.

In various example embodiments, the terminal device 110 is configured with a Pre-MG that is for other purposes than a PRS measurement but may be possible for the PRS measurement. If the PRS measurement is to be performed, the terminal device 110 evaluates whether the Pre-MG is suitable for the PRS measurement or not. The terminal device 110 decides whether a Pre-MG is to be activated and transmits to the base station 120 an indication (referred to as a first indication) whether the Pre-MG is suitable for the PRS measurement. In this way, the Pre-MG may be used for the PRS measurement when needed, while the useless activation of the Pre-MG for the PRS measurement may be avoided to mitigate the degradation of the system performance.

Figure 2:
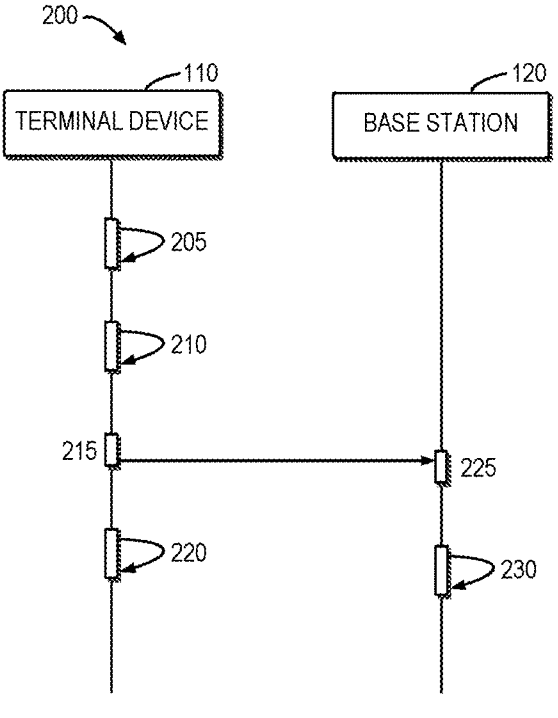
FIG. 2 illustrates an example process of Pre-MG activation/deactivation for the PRS measurement according to some example embodiments of the present disclosure.

FIG. 2 shows an example process 200 of Pre-MG activation/deactivation for the PRS measurement according to some example embodiments of the present disclosure.

In the process 200 as shown in FIG. 2, the terminal device 110 determines (205) that a measurement is to be performed for a PRS. For example, if the terminal device 110 receives a configuration of the PRS measurement, for example, in the LPP from a Location Server, the terminal device 110 may determine that the PRS measurement is to be performed. The terminal device 110 may make that determination based on other triggering events.

The terminal device 110 evaluates (210) whether a Pre-MG is suitable for the PRS measurement. For example, the terminal device 110 may determine whether a transmission occasion of the PRS is covered by the Pre-MG in a time domain. The determination may consider offset of the PRS and the Pre-MG, for example, whether the offset of the Pre-MG is aligned with the offset of the PRS. Alternatively or in addition, the periodicity of the PRS and the Pre-MG, and a time length of the Pre-MG and transmission repetitions of the PRS may alternatively or additionally considered to determine whether the transmission occasion of the PRS is covered by the Pre-MG. If the transmission occasion of the PRS is covered by the Pre-MG, it means that the terminal device 110 may detect the PRS during the Pre-MG. Thus, the terminal device 110 may determine that the preconfigured measurement gap is suitable for the measurement of the positioning reference signal.

Then, the terminal device 110 transmits (215), to the base station 120, the first indication whether the Pre-MG is suitable for the PRS measurement. The first indication may be transmitted in an uplink (UL) message such as a Radio Resource Control (RRC) location measurement indication, or a Media Access Control (MAC) control element (CE) as the UL message.

The first indication may be implemented in any suitable way. In some example embodiments, the first indication may be implemented by a flag as an explicit indicator, to indicate whether the Pre-MG is suitable for the PRS measurement. For example, a Pre-MG_reuse flag=true or false may be added into the location measurement indication. If the flag is set to be true, it may be indicated that the Pre-MG is suitable for the PRS measurement. If the flag is set to be false, it may be indicated that the Pre-MG is unsuitable for the PRS measurement. In the case that the flag is equal to false, the terminal device 110 may transmit to the base station 120 an additional requested MG. The flag and the requested MG are transmitted in separate messages or in the same message.

In some example embodiments, the flag and the requested MG may be carried in the location measurement indication message. In Rel-17, in the Location Measurement Indication message with an information element (IE) LocationMeasurementInfo, a UE may send to a NW the assistance information on a requested measurement gap, including measurement gap periodicity and offset, measurement gap length and the like, for example, in IEs nr-MeasPRS-Repetition AndOffset-r16/nr-MeasPRS-length-r16. The IE nr-MeasPRS-RepetitionAndOffset may indicate the gap periodicity in ms and offset in number of subframes of the requested measurement gap for performing NR DL-PRS measurements. The IE nr-MeasPRS-length may indicate a measurement gap length in ms of the requested measurement gap for performing NR DL-PRS measurements. The purpose of this procedure is to indicate to the NW that the UE is going to start/stop location related measurements towards E-UTRA or NR which require measurement gaps or start/stop detection of subframe and slot timing towards E-UTRA which requires measurement gaps. In the example embodiments where the flag and the requested MG may be carried in the location measurement indication message, a new IE may be added into the location measurement indication message to carry the flag.

In some other example embodiments, the first indication may be implemented by an implicit indicator. For example, the terminal device 110 may use a requested MG to implicitly indicate whether the Pre-MG is suitable for the PRS measurement. If the requested MG is the same as the Pre-MG, it may be indicated that the Pre-MG is suitable for the PRS measurement. If the requested MG is different from the Pre-MG, it may be indicated that the Pre-MG is unsuitable for the PRS measurement. The different requested MG may be a new MG that the terminal device 110 requests a NW to configure for PRS measurement. Such an implicit indicator may be implemented by the IE LocationMeasurementInfo in the Location Measurement Indication message. As such, there may be a small impact to the current specification.

After the first indication is transmitted to the base station 120, the terminal device 110 performs (220) an action based on the result of the evaluating (210). For example, if it is determined that the Pre-MG is suitable for the PRS measurement, the terminal device 110 may make a decision that the Pre-MG can be reused and always activated for the PRS measurement. Accordingly, the terminal device 110 may activate the Pre-MG for the PRS measurement. The Pre-MG may be activated immediately or after receiving a Hybrid automatic repeat request (HARQ) acknowledgement (ACK) from the base station 120, for example, on a physical (PHY) layer.

If it is determined that the Pre-MG is unsuitable for the PRS measurement, the terminal device 110 may decide that the Pre-MG cannot be activated for PRS measurement. In this case, the terminal device 110 may wait for a configuration of a new MG for the PRS measurement, from the base station 120.

At the NW side, the base station 120 receives (225) from the terminal device 110 the first indication whether the Pre-MG is suitable for the PRS measurement. The base station 120 then determines (230), based on the first indication, a MG to be activated by the terminal device 110 for the PRS measurement. For example, in the embodiments where the first indication is received in the Location Measurement Indication, the base station 120 may check the explicit or implicit indicator in the Location Measurement Indication and determine whether the Pre-MG will be activated by the terminal device 110 or a new MG is requested by the terminal device 110 for PRS measurement.

In some example embodiments, after the base station 120 decides to activate the Pre-MG, the base station 120 may transmit a PHY HARQ ACK to the terminal device 110 to instruct activation of the Pre-MG for the PRS measurement. In some example embodiments, after the base station 120 decides to configure a new MG for the PRS measurement, the base station 120 may transmit, to the terminal device 110, a configuration of a new MG for the PRS measurement.

In some example embodiments, if the terminal device 110 completes the PRS measurement, the terminal device 120 may inform the NW the PRS measurement is done (or stopped), and thus NW may know afterwards the gap is for SSB measurement. For example, upon completion of the PRS measurement based on the Pre-MG, the terminal device 110 may transmit, to the base station 120, an indication (referred to as a second indication) that the PRS measurement is stopped. Accordingly, the base station 120 may determine that the Pre-MG is deactivated for the PRS measurement.

Figure 3:
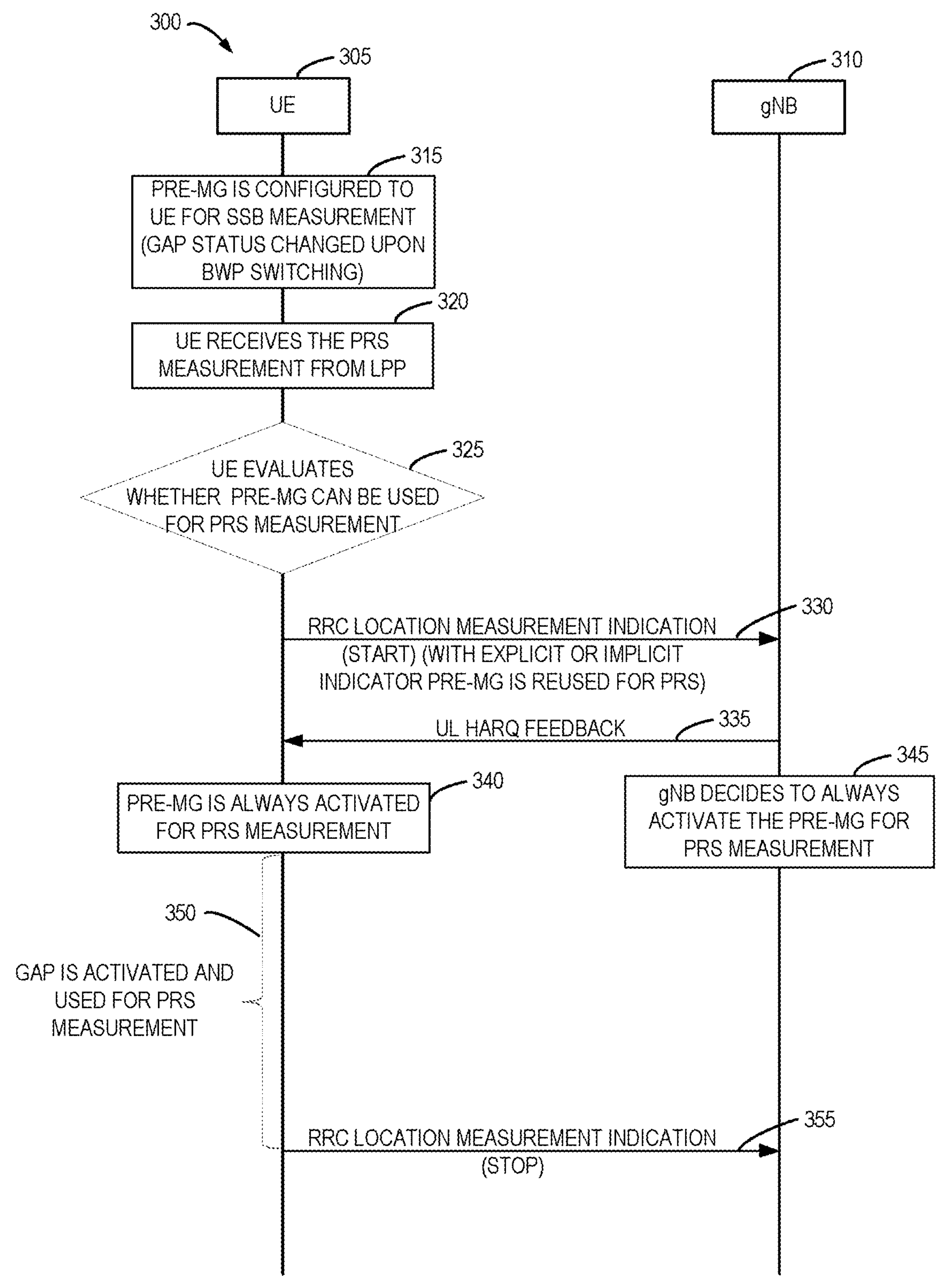
FIG. 3 illustrates an example location measurement indication procedure in the case that a Pre-MG can be reused for PRS measurement according to some example embodiments of the present disclosure.

FIG. 3 shows an example location measurement indication procedure 300 in the case that a Pre-MG can be reused for PRS measurement according to some example embodiments of the present disclosure. In this example, the terminal device 110 is implemented by a UE 305, and the base station 120 is implemented by a gNB 310.

As shown in FIG. 3, at 315, a Pre-MG is configured to the UE 305 for SSB measurement. The gap status may be changed upon BWP switching. At 320, the UE 305 receives the PRS measurement from the LPP. At 325, the UE 305 evaluates whether the Pre-MG can be used for PRS measurement. At 330, the UE 305 sends a RRC location measurement indication to the gNB 310 with explicit or implicit indicator to indicate that the Pre-MG is reused for PRS and to start the PRS measurement. At 335, the gNB 310 sends a UL HARQ feedback to the UE 305. At 340, the UE 305 determines that the Pre-MG is always activated for PRS measurement. At 345, the gNB 310 decides to always activate the Pre-MG for PRS measurement. At 350, the UE 304 activates and uses the gap for PRS measurement. At 355, the UE 305 sends a RRC location measurement indication to the gNB 310 to stop the PRS measurement.

Figure 4:
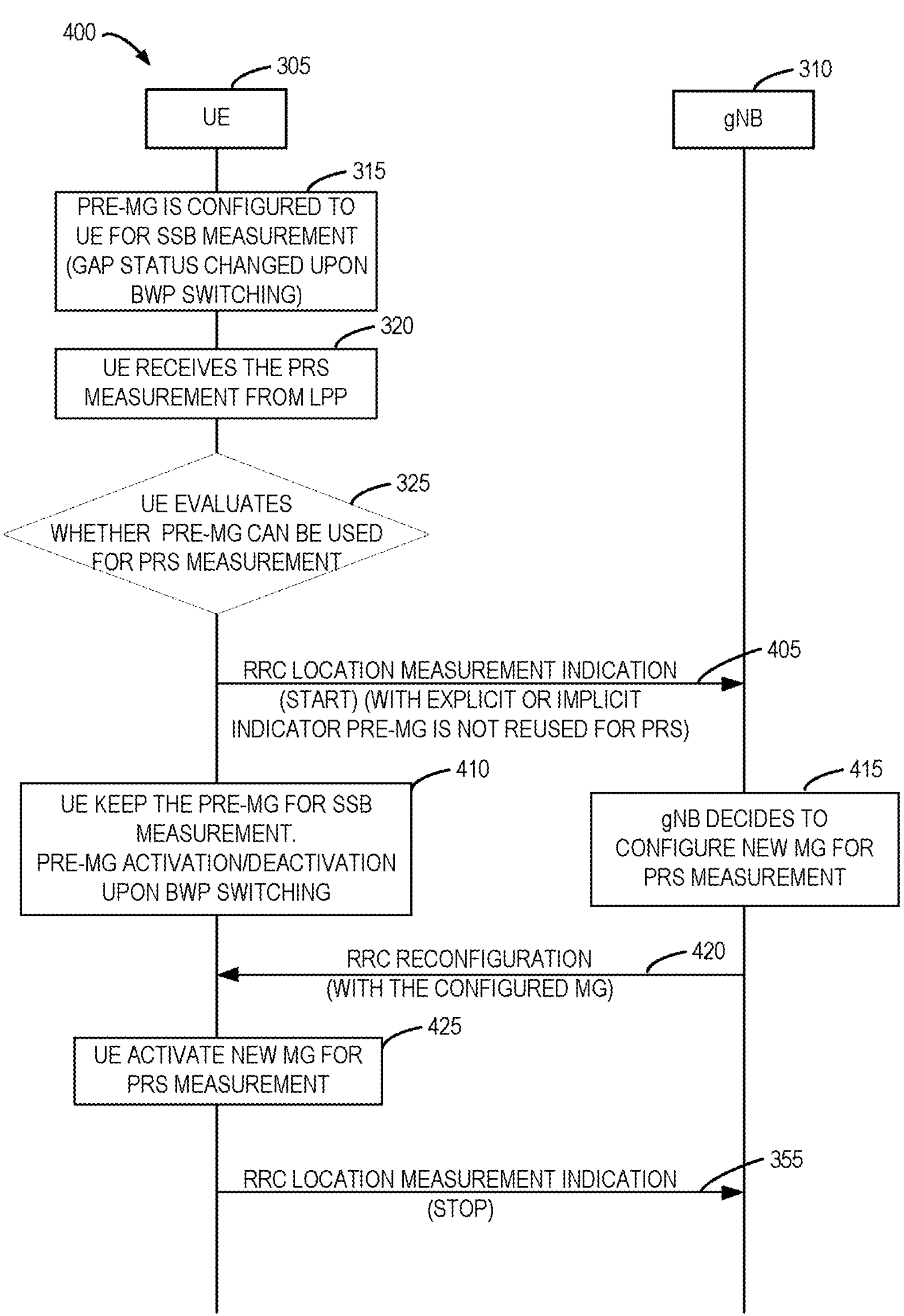
FIG. 4 illustrates an example location measurement indication procedure in the case that a Pre-MG cannot be reused for PRS measurement according to some example embodiments of the present disclosure.

FIG. 4 shows an example location measurement indication procedure 400 in the case that a Pre-MG cannot be reused for PRS measurement according to some example embodiments of the present disclosure.

As shown in FIG. 4, the procedure 400 is similar to the procedure 300 in FIG. 3. The difference between the procedure 400 and the procedure 300 is that the UE 305 evaluates that the Pre-MG cannot be used for PRS measurement. At 405, the UE 305 sends a RRC location measurement indication to the gNB 310 with explicit or implicit indicator to indicate that the Pre-MG is not reused for PRS and to start the PRS measurement. At 410, the UE 305 keeps the Pre-MG for SSB measurement. Pre-MG activation/deactivation may be upon BWP switching. At 415, the gNB 310 decides to configure a new MG for PRS measurement. At 420, the gNB 310 sends a RRC Reconfiguration message with the configured MG to the UE 305. At 425, the UE 305 activates the new MG for PRS measurement.

Figure 5:
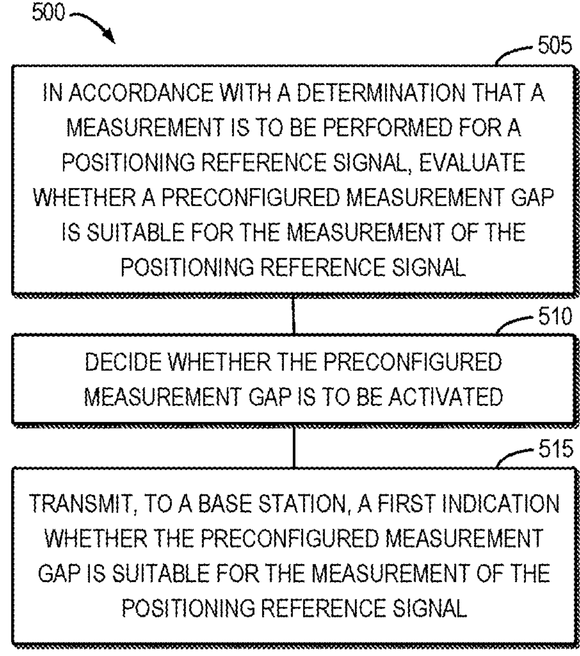
FIG. 5 illustrates a flowchart of an example method of autonomous Pre-MG activation for a PRS measurement at a terminal device according to some example embodiments of the present disclosure.

FIG. 5 shows an example method 500 of autonomous Pre-MG activation for a PRS measurement according to some example embodiments of the present disclosure. The method 500 can be implemented at the terminal device 110 as shown in FIG. 1. For the purpose of discussion, the method 500 will be discussed below with reference to FIG. 1.

As shown in FIG. 5, at block 505, if it is determined that a measurement is to be performed for a PRS, the terminal device 110 evaluates whether a Pre-MG is suitable for the PRS measurement. In some example embodiments, the terminal device 110 may determine whether a transmission occasion of the PRS is covered by the Pre-MG in a time domain. If it is determined that the transmission occasion of the PRS is covered by Pre-MG in the time domain, the terminal device 110 may determine that the Pre-MG is suitable for the PRS measurement. In some example embodiments, the terminal device 110 may determine whether the transmission occasion of the PRS is covered by the Pre-MG, based on offset of the PRS and the Pre-MG, periodicity of the PRS and the Pre-MG, and/or a time length of the Pre-MG and transmission repetitions of the PRS.

At block 510, the terminal device 110 decides whether the Pre-MG is to be activated. At block 515, the terminal device 110 transmits, to the base station 120, the first indication whether the preconfigured measurement gap is suitable for the measurement of the positioning reference signal. In some example embodiments, the first indication may comprise a flag to indicate whether the preconfigured measurement gap is suitable for the measurement of the positioning reference signal. In some example embodiments, if it is determined that the Pre-MG is suitable for the PRS measurement, the terminal device 110 may set the flag to be true; otherwise, the terminal device 110 may set the flag to be false. In some example embodiments, if it is determined that the Pre-MG is unsuitable for the PRS measurement, the terminal device 110 may transmit a requested MG for the PRS measurement to the base station 120.

In some example embodiments, the first indication may comprise a requested MG for the PRS measurement being the same as the Pre-MG, to indicate that the Pre-MG is suitable for the measurement of the positioning reference signal. Alternatively or in addition, the first indication may comprise a requested MG for the PRS measurement being different from the Pre-MG, to indicate that the Pre-MG is unsuitable for the PRS measurement.

In some example embodiments, if it is determined that the Pre-MG is suitable for the PRS measurement, the terminal device 110 may activate the Pre-MG for the PRS measurement. In some example embodiments, the terminal device 110 may activate the Pre-MG immediately. In some other example embodiments, the terminal device 110 may activate the Pre-MG after receiving a HARQ ACK from the base station 120. In some example embodiments, if it is determined that that the Pre-MG is unsuitable for the PRS measurement, the terminal device 110 may wait for a configuration of a new MG for the PRS measurement, from the base station 120.

In some example embodiments, after the PRS measurement is completed based on the Pre-MG, the terminal device 110 may transmit, to the base station 120, the second indication that the PRS measurement is stopped.

Figure 6:
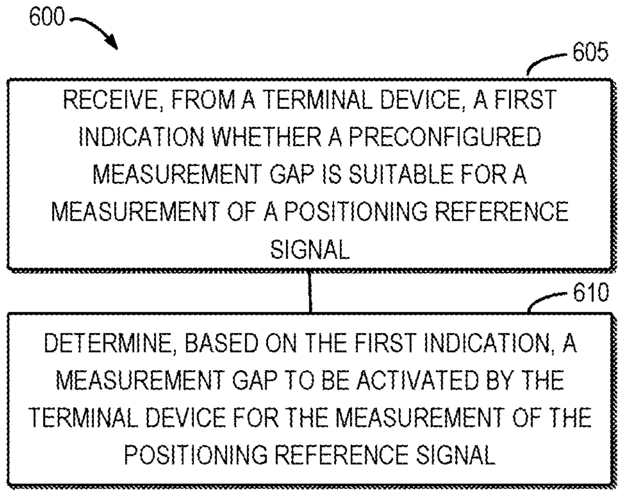
FIG. 6 illustrates a flowchart of an example method of autonomous Pre-MG activation for a PRS measurement at a base station according to some other example embodiments of the present disclosure.

FIG. 6 shows an example method 600 of autonomous Pre-MG activation for a PRS measurement according to some other example embodiments of the present disclosure. The method 600 can be implemented at the base station 120 as shown in FIG. 1. For the purpose of discussion, the method 600 will be discussed below with reference to FIG. 1.

As shown in FIG. 6, at block 605, the base station 120 receives, from the terminal device 110, the first indication whether a Pre-MG is suitable for a PRS measurement. At block 610, the base station 120 determines, based on the first indication, a MG to be activated by the terminal device 110 for the PRS measurement.

In some example embodiments, the first indication may comprise a flag to indicate whether the Pre-MG is suitable for the PRS measurement. The flag set to be true may indicate that the Pre-MG is suitable for the PRS measurement. Alternatively or in addition, the flag set to be false may indicate that the Pre-MG is unsuitable for the PRS measurement. In some example embodiments, if the first indication indicates that the Pre-MG is unsuitable for the PRS measurement, the base station 120 may receive a requested MG for the PRS measurement from the terminal device 110.

In some example embodiments, if the first indication indicates that the Pre-MG is suitable for the PRS measurement, the base station 120 may determine that the Pre-MG is to be activated by the terminal device 110 for the PRS measurement. In some example embodiments, the base station 120 may transmit a HARQ ACK to the terminal device 110 to instruct activation of the Pre-MG for the PRS measurement. In some example embodiments, if the first indication indicates that the Pre-MG is unsuitable for the PRS measurement, the base station 120 may transmit, to the terminal device 110, a configuration of a new MG for the PRS measurement.

In some example embodiments, after the base station 120 receives, from the terminal device, the second indication that the PRS measurement is stopped, the base station 120 may determine that the Pre-MG is deactivated for the PRS measurement.

All operations and processing as described above with reference to FIGS. 1-4 are likewise applicable to the method 500 and 600 and have similar effects. For the purpose of simplification, the details will be omitted.

Figure 7:
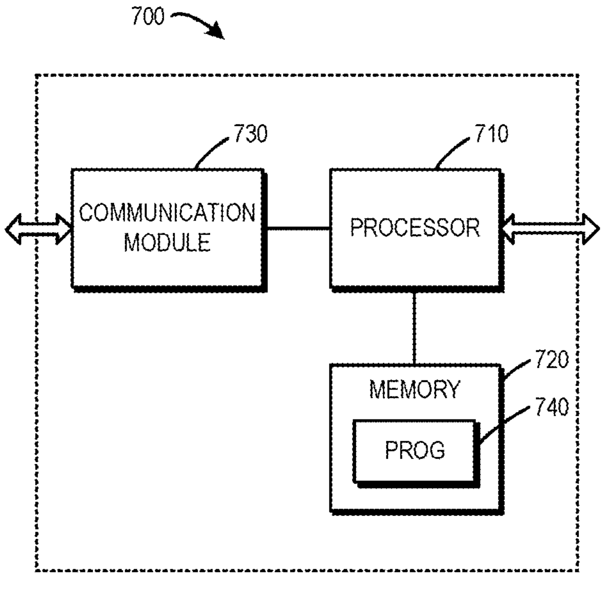
FIG. 7 illustrates a simplified block diagram of a device that is suitable for implementing example embodiments of the present disclosure.

FIG. 7 is a simplified block diagram of a device 700 that is suitable for implementing example embodiments of the present disclosure.

As shown, the device 700 includes a processor 710, a memory 720 coupled to the processor 710, a communication module 730 coupled to the processor 710, and a communication interface (not shown) coupled to the communication module 730. The memory 720 stores at least a program 740. The communication module 730 is for bidirectional communications, for example, via multiple antennas. The communication interface may represent any interface that is necessary for communication.

The program 740 is assumed to include program instructions that, when executed by the associated processor 710, enable the device 700 to operate in accordance with the example embodiments of the present disclosure, as discussed herein with reference to FIGS. 1-6. The example embodiments herein may be implemented by computer software executable by the processor 710 of the device 700, or by hardware, or by a combination of software and hardware. The processor 710 may be configured to implement various example embodiments of the present disclosure.

The memory 720 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 720 is shown in the device 700, there may be several physically distinct memory modules in the device 700. The processor 710 may be of any type suitable to the local technical network, and may include one or more of general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

When the device 700 acts as the terminal device 110, the processor 710 and the communication module 730 may cooperate to implement the method 500 as described above with reference to FIGS. 1-5. All operations and features as described above with reference to FIGS. 1-5 are likewise applicable to the terminal device 110 and have similar effects. When the device 700 acts as the base station 120, the processor 710 and the communication module 730 may cooperate to implement the method 500 as described above with reference to FIGS. 1-4 and 6. All operations and features as described above with reference to FIGS. 1-4 and 6 are likewise applicable to the base station 120 and have similar effects. For the purpose of simplification, the details will be omitted.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 500 or 600 as described above with reference to FIGS. 1-6. Generally, program modules include routines, programs, libraries, objects, classes, components, data structures, or the like that perform particular tasks or implement particular abstract data types. The functionality of the program modules may be combined or split between program modules as desired in various example embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single embodiment. Conversely, various features that are described in the context of a single embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various example embodiments of the techniques have been described. In addition to or as an alternative to the above, the following examples are described. The features described in any of the following examples may be utilized with any of the other examples described herein.

In some aspects, a terminal device comprises: at least one processor; and at least one memory including computer program code; the at least one memory and the computer program code configured to, with the at least one processor, cause the device to: in accordance with a determination that a measurement is to be performed for a positioning reference signal, evaluate whether a preconfigured measurement gap is suitable for the measurement of the positioning reference signal; decide whether the preconfigured measurement gap is to be activated; and transmit, to a base station, a first indication whether the preconfigured measurement gap is suitable for the measurement of the positioning reference signal.

In some example embodiments, the first indication comprises a flag to indicate whether the preconfigured measurement gap is suitable for the measurement of the positioning reference signal.

In some example embodiments, the terminal device is further caused to: in accordance with a determination that the preconfigured measurement gap is suitable for the measurement of the positioning reference signal, set the flag to be true; and/or in accordance with a determination that the preconfigured measurement gap is unsuitable for the measurement of the positioning reference signal, set the flag to be false.

In some example embodiments, the terminal device is further caused to: in accordance with a determination that the preconfigured measurement gap is unsuitable for the measurement of the positioning reference signal, transmit a requested measurement gap for the measurement of the positioning reference signal to the base station.

In some example embodiments, the first indication comprises: a requested measurement gap for the measurement of the positioning reference signal being the same as the preconfigured measurement gap, to indicate that the preconfigured measurement gap is suitable for the measurement of the positioning reference signal; and/or a requested measurement gap for the measurement of the positioning reference signal being different from the preconfigured measurement gap, to indicate that the preconfigured measurement gap is unsuitable for the measurement of the positioning reference signal.

In some example embodiments, the terminal device is further caused to: in accordance with a determination that the preconfigured measurement gap is suitable for the measurement of the positioning reference signal, activate the preconfigured measurement gap for the measurement of the positioning reference signal.

In some example embodiments, the terminal device is caused to activate the preconfigured measurement gap for the measurement of the positioning reference signal by: in response to receiving a Hybrid automatic repeat request acknowledgement from the base station, activating the preconfigured measurement gap for the measurement of the positioning reference signal.

In some example embodiments, the terminal device is further caused to: in accordance with a determination that the preconfigured measurement gap is unsuitable for the measurement of the positioning reference signal, wait for a configuration of a new measurement gap for the measurement of the positioning reference signal, from the base station.

In some example embodiments, the terminal device is further caused to: upon completion of the measurement of the positioning reference signal based on the preconfigured measurement gap, transmit, to the base station, a second indication that the measurement of the positioning reference signal is stopped.

In some example embodiments, the terminal device is caused to evaluate whether the preconfigured measurement gap is suitable for the measurement of the positioning reference signal by: determining whether a transmission occasion of the positioning reference signal is covered by the preconfigured measurement gap in a time domain; and in accordance with a determination that the transmission occasion of the positioning reference signal is covered by preconfigured measurement gap in the time domain, determining that the preconfigured measurement gap is suitable for the measurement of the positioning reference signal.

In some example embodiments, the terminal device is caused to determine whether the transmission occasion of the positioning reference signal is covered by the preconfigured measurement gap in the time domain, based on at least one of: offset of the positioning reference signal and the preconfigured measurement gap, periodicity of the positioning reference signal and the preconfigured measurement gap, or a time length of the preconfigured measurement gap and transmission repetitions of the positioning reference signal.

In some aspects, a base station comprises: at least one processor; and at least one memory including computer program code; the at least one memory and the computer program code configured to, with the at least one processor, cause the base station to: receive, from a terminal device, a first indication whether a preconfigured measurement gap is suitable for a measurement of a positioning reference signal; and determine, based on the first indication, a measurement gap to be activated by the terminal device for the measurement of the positioning reference signal.

In some example embodiments, the first indication comprises a flag to indicate whether the preconfigured measurement gap is suitable for the measurement of the positioning reference signal.

In some example embodiments, the flag set to be true indicates that the preconfigured measurement gap is suitable for the measurement of the positioning reference signal; and/or the flag set to be false indicates that the preconfigured measurement gap is unsuitable for the measurement of the positioning reference signal.

In some example embodiments, the base station is further caused to: in response to the first indication indicating that the preconfigured measurement gap is unsuitable for the measurement of the positioning reference signal, receive a requested measurement gap for the measurement of the positioning reference signal from the terminal device.

In some example embodiments, the first indication comprises: a requested measurement gap for the measurement of the positioning reference signal measurement being the same as the preconfigured measurement gap, to indicate that the preconfigured measurement gap is suitable for the measurement of the positioning reference signal; and/or a requested measurement gap for the measurement of the positioning reference signal being different from the preconfigured measurement gap, to indicate that the preconfigured measurement gap is unsuitable for the measurement of the positioning reference signal.

In some example embodiments, the base station is caused to determine the measurement gap to be activated by the terminal device for the measurement of the positioning reference signal by: in response to the first indication indicating that the preconfigured measurement gap is suitable for the measurement of the positioning reference signal, determining that the preconfigured measurement gap is to be activated by the terminal device for the measurement of the positioning reference signal.

In some example embodiments, the base station is further caused to: transmit a Hybrid automatic repeat request acknowledgement to the terminal device to instruct activation of the preconfigured measurement gap for the measurement of the positioning reference signal.

In some example embodiments, the base station is further caused to: in response to the first indication indicating that the preconfigured measurement gap is unsuitable for the measurement of the positioning reference signal, transmit, to the terminal device, a configuration of a new measurement gap for the measurement of the positioning reference signal.

In some example embodiments, the base station is further caused to: in response to receiving, from the terminal device, a second indication that the measurement of the positioning reference signal is stopped, determine that the preconfigured measurement gap is deactivated for the measurement of the positioning reference signal.

In some aspects, a method comprises: at a terminal device, in accordance with a determination that a measurement is to be performed for a positioning reference signal, evaluating whether a preconfigured measurement gap is suitable for the measurement of the positioning reference signal; deciding whether the preconfigured measurement gap is to be activated; and transmitting, to a base station, a first indication whether the preconfigured measurement gap is suitable for the measurement of the positioning reference signal.

In some example embodiments, the first indication comprises a flag to indicate whether the preconfigured measurement gap is suitable for the measurement of the positioning reference signal.

In some example embodiments, the method further comprises: in accordance with a determination that the preconfigured measurement gap is suitable for the measurement of the positioning reference signal, setting the flag to be true; and/or in accordance with a determination that the preconfigured measurement gap is unsuitable for the measurement of the positioning reference signal, setting the flag to be false.

In some example embodiments, the method further comprises: in accordance with a determination that the preconfigured measurement gap is unsuitable for the measurement of the positioning reference signal, transmitting a requested measurement gap for the measurement of the positioning reference signal to the base station.

In some example embodiments, the first indication comprises: a requested measurement gap for the measurement of the positioning reference signal being the same as the preconfigured measurement gap, to indicate that the preconfigured measurement gap is suitable for the measurement of the positioning reference signal; and/or a requested measurement gap for the measurement of the positioning reference signal being different from the preconfigured measurement gap, to indicate that the preconfigured measurement gap is unsuitable for the measurement of the positioning reference signal.

In some example embodiments, the method further comprises: in accordance with a determination that the preconfigured measurement gap is suitable for the measurement of the positioning reference signal, activating the preconfigured measurement gap for the measurement of the positioning reference signal.

In some example embodiments, activating the preconfigured measurement gap for the measurement of the positioning reference signal comprises: in response to receiving a Hybrid automatic repeat request acknowledgement from the base station, activating the preconfigured measurement gap for the measurement of the positioning reference signal.

In some example embodiments, the method further comprises: in accordance with a determination that the preconfigured measurement gap is unsuitable for the measurement of the positioning reference signal, waiting for a configuration of a new measurement gap for the measurement of the positioning reference signal, from the base station.

In some example embodiments, the method further comprises: upon completion of the measurement of the positioning reference signal based on the preconfigured measurement gap, transmitting, to the base station, a second indication that the measurement of the positioning reference signal is stopped.

In some example embodiments, evaluating whether the preconfigured measurement gap is suitable for the measurement of the positioning reference signal comprises: determining whether a transmission occasion of the positioning reference signal is covered by the preconfigured measurement gap in a time domain; and in accordance with a determination that the transmission occasion of the positioning reference signal is covered by preconfigured measurement gap in the time domain, determining that the preconfigured measurement gap is suitable for the measurement of the positioning reference signal.

In some example embodiments, determining whether the transmission occasion of the positioning reference signal is covered by the preconfigured measurement gap in the time domain is based on at least one of: offset of the positioning reference signal and the preconfigured measurement gap, periodicity of the positioning reference signal and the preconfigured measurement gap, or a time length of the preconfigured measurement gap and transmission repetitions of the positioning reference signal.

In some aspects, a method comprises: at a base station, receiving, from a terminal device, a first indication whether a preconfigured measurement gap is suitable for a measurement of a positioning reference signal; and determining, based on the first indication, a measurement gap to be activated by the terminal device for the measurement of the positioning reference signal.

In some example embodiments, the first indication comprises a flag to indicate whether the preconfigured measurement gap is suitable for the measurement of the positioning reference signal.

In some example embodiments, the flag set to be true indicates that the preconfigured measurement gap is suitable for the measurement of the positioning reference signal; and/or the flag set to be false indicates that the preconfigured measurement gap is unsuitable for the measurement of the positioning reference signal.

In some example embodiments, the method further comprises: in response to the first indication indicating that the preconfigured measurement gap is unsuitable for the measurement of the positioning reference signal, receiving a requested measurement gap for the measurement of the positioning reference signal from the terminal device.

In some example embodiments, the first indication comprises: a requested measurement gap for the measurement of the positioning reference signal being the same as the preconfigured measurement gap, to indicate that the preconfigured measurement gap is suitable for the measurement of the positioning reference signal; and/or a requested measurement gap for the measurement of the positioning reference signal being different from the preconfigured measurement gap, to indicate that the preconfigured measurement gap is unsuitable for the measurement of the positioning reference signal.

In some example embodiments, determining the measurement gap to be activated by the terminal device for the measurement of the positioning reference signal comprises: in response to the first indication indicating that the preconfigured measurement gap is suitable for the measurement of the positioning reference signal, determining that the preconfigured measurement gap is to be activated by the terminal device for the measurement of the positioning reference signal.

In some example embodiments, the method further comprises: transmitting a Hybrid automatic repeat request acknowledgement to the terminal device to instruct activation of the preconfigured measurement gap for the measurement of the positioning reference signal.

In some example embodiments, the method further comprises: in response to the first indication indicating that the preconfigured measurement gap is unsuitable for the measurement of the positioning reference signal, transmitting, to the terminal device, a configuration of a new measurement gap for the measurement of the positioning reference signal.

In some example embodiments, the method further comprises: in response to receiving, from the terminal device, a second indication that the measurement of the positioning reference signal is stopped, determining that the preconfigured measurement gap is deactivated for the measurement of the positioning reference signal.

In some aspects, an apparatus comprises: means for in accordance with a determination that a measurement is to be performed for a positioning reference signal, evaluating whether a preconfigured measurement gap is suitable for the measurement of the positioning reference signal; means for deciding whether the preconfigured measurement gap is to be activated; and means for transmitting, to a base station, a first indication whether the preconfigured measurement gap is suitable for the measurement of the positioning reference signal.

In some example embodiments, the first indication comprises a flag to indicate whether the preconfigured measurement gap is suitable for the measurement of the positioning reference signal.

In some example embodiments, the apparatus further comprises: means for in accordance with a determination that the preconfigured measurement gap is suitable for the measurement of the positioning reference signal, setting the flag to be true; and/or means for in accordance with a determination that the preconfigured measurement gap is unsuitable for the measurement of the positioning reference signal, setting the flag to be false.

In some example embodiments, the apparatus further comprises: means for in accordance with a determination that the preconfigured measurement gap is unsuitable for the measurement of the positioning reference signal, transmitting a requested measurement gap for the measurement of the positioning reference signal to the base station.

In some example embodiments, the first indication comprises: a requested measurement gap for the measurement of the positioning reference signal being the same as the preconfigured measurement gap, to indicate that the preconfigured measurement gap is suitable for the measurement of the positioning reference signal; and/or a requested measurement gap for the measurement of the positioning reference signal being different from the preconfigured measurement gap, to indicate that the preconfigured measurement gap is unsuitable for the measurement of the positioning reference signal.

In some example embodiments, the apparatus further comprises: means for in accordance with a determination that the preconfigured measurement gap is suitable for the measurement of the positioning reference signal, activating the preconfigured measurement gap for the measurement of the positioning reference signal.

In some example embodiments, the means for activating the preconfigured measurement gap for the measurement of the positioning reference signal comprises: means for in response to receiving a Hybrid automatic repeat request acknowledgement from the base station, activating the preconfigured measurement gap for the measurement of the positioning reference signal.

In some example embodiments, the apparatus further comprises: means for in accordance with a determination that the preconfigured measurement gap is unsuitable for the measurement of the positioning reference signal, waiting for a configuration of a new measurement gap for the measurement of the positioning reference signal, from the base station.

In some example embodiments, the apparatus further comprises: means for upon completion of the measurement of the positioning reference signal based on the preconfigured measurement gap, transmitting, to the base station, a second indication that the measurement of the positioning reference signal is stopped.

In some example embodiments, the means for evaluating whether the preconfigured measurement gap is suitable for the measurement of the positioning reference signal comprises: means for determining whether a transmission occasion of the positioning reference signal is covered by the preconfigured measurement gap in a time domain; and means for in accordance with a determination that the transmission occasion of the positioning reference signal is covered by preconfigured measurement gap in the time domain, determining that the preconfigured measurement gap is suitable for the measurement of the positioning reference signal.

In some example embodiments, the means for determining whether the transmission occasion of the positioning reference signal is covered by the preconfigured measurement gap in the time domain comprises means for determining whether the transmission occasion of the positioning reference signal is covered by the preconfigured measurement gap in the time domain based on at least one of: offset of the positioning reference signal and the preconfigured measurement gap, periodicity of the positioning reference signal and the preconfigured measurement gap, or a time length of the preconfigured measurement gap and transmission repetitions of the positioning reference signal.

In some aspects, a method comprises: means for receiving, from a terminal device, a first indication whether a preconfigured measurement gap is suitable for a measurement of a positioning reference signal; and means for determining, based on the first indication, a measurement gap to be activated by the terminal device for the measurement of the positioning reference signal.

In some example embodiments, the first indication comprises a flag to indicate whether the preconfigured measurement gap is suitable for the measurement of the positioning reference signal.

In some example embodiments, the flag set to be true indicates that the preconfigured measurement gap is suitable for the measurement of the positioning reference signal;

and/or the flag set to be false indicates that the preconfigured measurement gap is unsuitable for the measurement of the positioning reference signal.

In some example embodiments, the apparatus further comprises: means for in response to the first indication indicating that the preconfigured measurement gap is unsuitable for the measurement of the positioning reference signal, receiving a requested measurement gap for the measurement of the positioning reference signal from the terminal device.

In some example embodiments, the first indication comprises: a requested measurement gap for the measurement of the positioning reference signal being the same as the preconfigured measurement gap, to indicate that the preconfigured measurement gap is suitable for the measurement of the positioning reference signal; and/or a requested measurement gap for the measurement of the positioning reference signal being different from the preconfigured measurement gap, to indicate that the preconfigured measurement gap is unsuitable for the measurement of the positioning reference signal.

In some example embodiments, the means for determining the measurement gap to be activated by the terminal device for the measurement of the positioning reference signal comprises: means for in response to the first indication indicating that the preconfigured measurement gap is suitable for the measurement of the positioning reference signal, determining that the preconfigured measurement gap is to be activated by the terminal device for the measurement of the positioning reference signal.

In some example embodiments, the apparatus further comprises: means for transmitting a Hybrid automatic repeat request acknowledgement to the terminal device to instruct activation of the preconfigured measurement gap for the measurement of the positioning reference signal.

In some example embodiments, the apparatus further comprises: means for in response to the first indication indicating that the preconfigured measurement gap is unsuitable for the measurement of the positioning reference signal, transmitting, to the terminal device, a configuration of a new measurement gap for the measurement of the positioning reference signal.

In some example embodiments, the apparatus further comprises: means for in response to receiving, from the terminal device, a second indication that the measurement of the positioning reference signal is stopped, determining that the preconfigured measurement gap is deactivated for the measurement of the positioning reference signal.

In some aspects, a computer readable storage medium comprises program instructions stored thereon, the instructions, when executed by a processor of a device, causing the device to perform the method according to some example embodiments of the present disclosure.

We claim:

1. A method comprising:

at a terminal device;

in accordance with a determination that a measurement is to be performed for a positioning reference signal, evaluating whether a preconfigured measurement gap is suitable for the measurement of the positioning reference signal by:

determining whether a transmission occasion of the positioning reference signal is covered by the preconfigured measurement gap in a time domain based on the following:

offset of the positioning reference signal and the preconfigured measurement gap;

periodicity of the positioning reference signal and the preconfigured measurement gap; and a time length of the preconfigured measurement gap and transmission repetitions of the positioning reference signal; and in accordance with a determination that the transmission occasion of the positioning reference signal is not covered by the preconfigured measurement gap in the time domain, determining that the preconfigured measurement gap is not suitable for the measurement of the positioning reference signal;

based on determining that the preconfigured measurement gap is not suitable for the measurement of the positioning reference signal, determining that the preconfigured measurement gap is not to be activated;

transmitting, to a base station, a first indication that the preconfigured measurement gap is not suitable for the measurement of the positioning reference signal, the first indication comprising a requested measurement gap for the positioning reference signal being different from the preconfigured measurement gap to indicate that the preconfigured measurement gap is unsuitable for the positioning reference signal;

based on the transmitting, receiving, from the base station, the requested measurement gap for the measurement of the positioning reference signal; and activating the requested measurement gap for the measurement of the positioning reference signal.

2. The method of claim 1, wherein the first indication comprises a flag to indicate that the preconfigured measurement gap is not suitable for the measurement of the positioning reference signal.

3. The method of claim 2, further comprising: in accordance with a determination that the preconfigured measurement gap is unsuitable for the measurement of the positioning reference signal, setting the flag to be false.

4. The method of claim 3, wherein activating the requested measurement gap for the measurement of the positioning reference signal comprises: in response to receiving a Hybrid automatic repeat request acknowledgement from the base station, activating the requested measurement gap for the measurement of the positioning reference signal.

5. The method of claim 4, further comprising: upon completion of the measurement of the positioning reference signal based on the preconfigured measurement gap, transmitting, to the base station, a second indication that the measurement of the positioning reference signal is stopped.

6. The method of claim 5, wherein the activation of the requested measurement gap follows a timer based bandwidth part (BWP) switch.

7. The method of claim 6, wherein measurement period requirements with preconfigured measurement gap patterns are defined in a presence of one or more BWP switch per measurement period.

8. A user equipment comprising:

at least one processor; and a memory comprising computer-executable instructions that, when executed by the processor, cause the user equipment to perform the following operations:

in accordance with a determination that a measurement is to be performed for a positioning reference signal, evaluating whether a preconfigured measurement gap is suitable for the measurement of the positioning reference signal by:

determining whether a transmission occasion of the positioning reference signal is covered by the preconfigured measurement gap in a time domain based on the following:

offset of the positioning reference signal and the preconfigured measurement gap;

periodicity of the positioning reference signal and the preconfigured measurement gap; and a time length of the preconfigured measurement gap and transmission repetitions of the positioning reference signal; and in accordance with a determination that the transmission occasion of the positioning reference signal is not covered by the preconfigured measurement gap in the time domain, determining that the preconfigured measurement gap is not suitable for the measurement of the positioning reference signal;

based on determining that the preconfigured measurement gap is not suitable for the measurement of the positioning reference signal, determining that the preconfigured measurement gap is not to be activated;

transmitting, to a base station, a first indication that the preconfigured measurement gap is not suitable for the measurement of the positioning reference signal, the first indication comprising a requested measurement gap for the positioning reference signal being different from the preconfigured measurement gap to indicate that the preconfigured measurement gap is unsuitable for the positioning reference signal;

based on the transmitting, receiving, from the base station, the requested measurement gap for the measurement of the positioning reference signal; and activating the requested measurement gap for the measurement of the positioning reference signal.

9. The user equipment of claim 8, wherein the first indication comprises a flag to indicate that the preconfigured measurement gap is not suitable for the measurement of the positioning reference signal.

10. The user equipment of claim 9, wherein the computer-executable instructions further cause the user equipment to, in accordance with a determination that the preconfigured measurement gap is unsuitable for the measurement of the positioning reference signal, set the flag to be false.

11. The user equipment of claim 10, wherein activating the requested measurement gap for the measurement of the positioning reference signal comprises: in response to receiving a Hybrid automatic repeat request acknowledgement from the base station, activating the requested measurement gap for the measurement of the positioning reference signal.

12. The user equipment of claim 11, wherein the computer-executable instructions further cause the user equipment to, upon completion of the measurement of the positioning reference signal based on the preconfigured measurement gap, transmitting, to the base station, a second indication that the measurement of the positioning reference signal is stopped.

13. The user equipment of claim 12, wherein the activation of the requested measurement gap follows a timer based bandwidth part (BWP) switch.

14. The user equipment of claim 13, wherein measurement period requirements with preconfigured measurement gap patterns are defined in a presence of one or more BWP switch per measurement period.

15. A system comprising:

a user equipment;

at least one processor; and a memory comprising computer-executable instructions that, when executed by the processor, cause the user equipment to perform the following operations:

in accordance with a determination that a measurement is to be performed for a positioning reference signal, evaluating whether a preconfigured measurement gap is suitable for the measurement of the positioning reference signal by:

determining whether a transmission occasion of the positioning reference signal is covered by the preconfigured measurement gap in a time domain based on the following:

offset of the positioning reference signal and the preconfigured measurement gap;

periodicity of the positioning reference signal and the preconfigured measurement gap; and a time length of the preconfigured measurement gap and transmission repetitions of the positioning reference signal; and in accordance with a determination that the transmission occasion of the positioning reference signal is not covered by the preconfigured measurement gap in the time domain, determining that the preconfigured measurement gap is not suitable for the measurement of the positioning reference signal;

based on determining that the preconfigured measurement gap is not suitable for the measurement of the positioning reference signal, determining that the preconfigured measurement gap is not to be activated;

transmitting, to a base station, a first indication that the preconfigured measurement gap is not suitable for the measurement of the positioning reference signal, the first indication comprising a requested measurement gap for the positioning reference signal being different from the preconfigured measurement gap to indicate that the preconfigured measurement gap is unsuitable for the positioning reference signal;

based on the transmitting, receiving, from the base station, the requested measurement gap for the measurement of the positioning reference signal; and activating the requested measurement gap for the measurement of the positioning reference signal.

16. The user equipment of claim 15, wherein the first indication comprises a flag to indicate that the preconfigured measurement gap is not suitable for the measurement of the positioning reference signal.

17. The user equipment of claim 16, wherein the computer-executable instructions further cause the user equipment to, in accordance with a determination that the preconfigured measurement gap is unsuitable for the measurement of the positioning reference signal, set the flag to be false.

18. The user equipment of claim 17, wherein activating the requested measurement gap for the measurement of the positioning reference signal comprises: in response to receiving a Hybrid automatic repeat request acknowledgement from the base station, activating the requested measurement gap for the measurement of the positioning reference signal.

19. The user equipment of claim 18, wherein the computer-executable instructions further cause the user equipment to, upon completion of the measurement of the positioning reference signal based on the preconfigured measurement gap, transmitting, to the base station, a second indication that the measurement of the positioning reference signal is stopped.

20. The user equipment of claim 19, wherein the activation of the requested measurement gap follows a timer based bandwidth part (BWP) switch, and wherein measurement period requirements with preconfigured measurement gap patterns are defined in a presence of one or more BWP switch per measurement period.

* * * * *